Patented Jan. 4, 1944

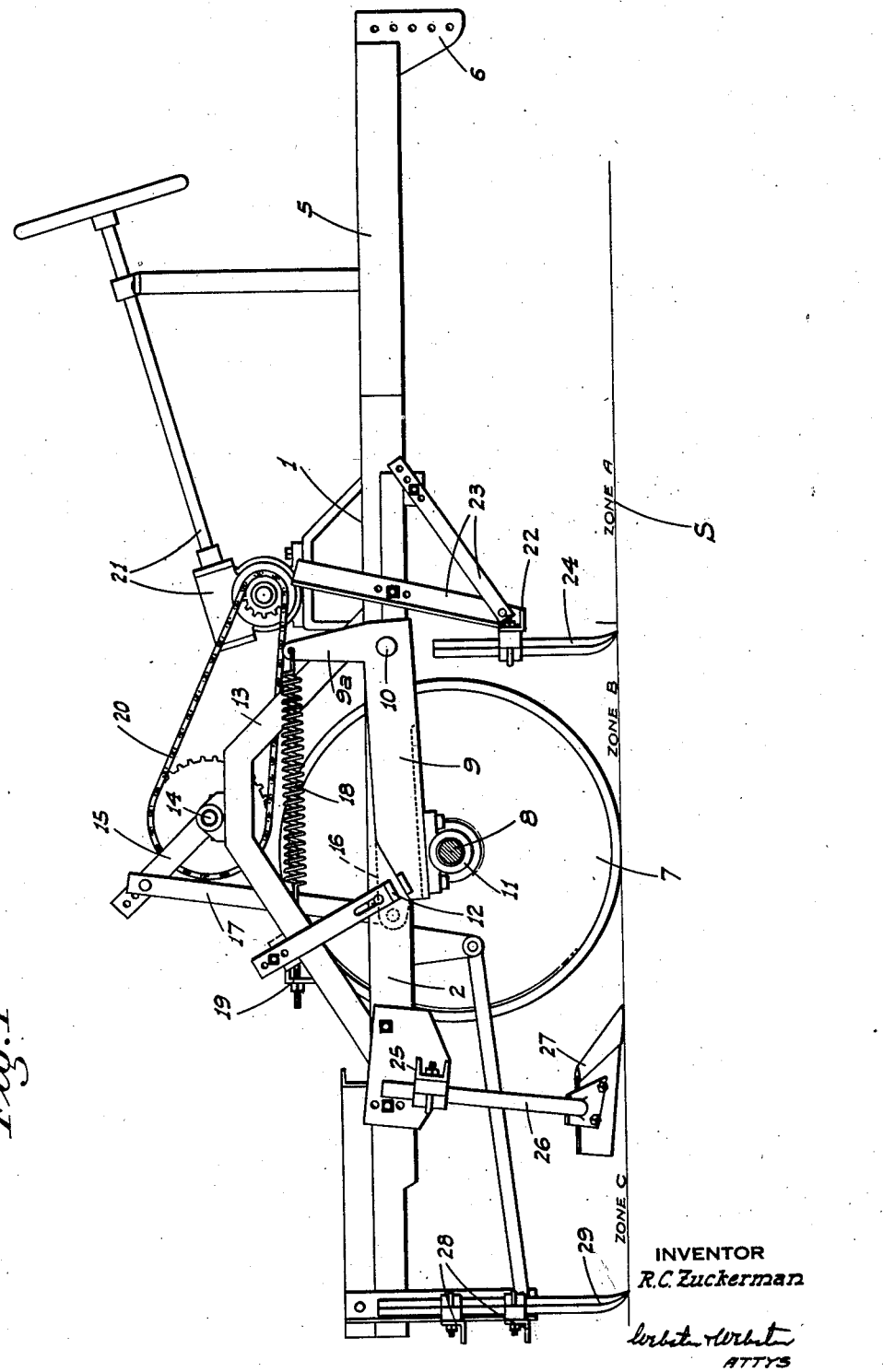

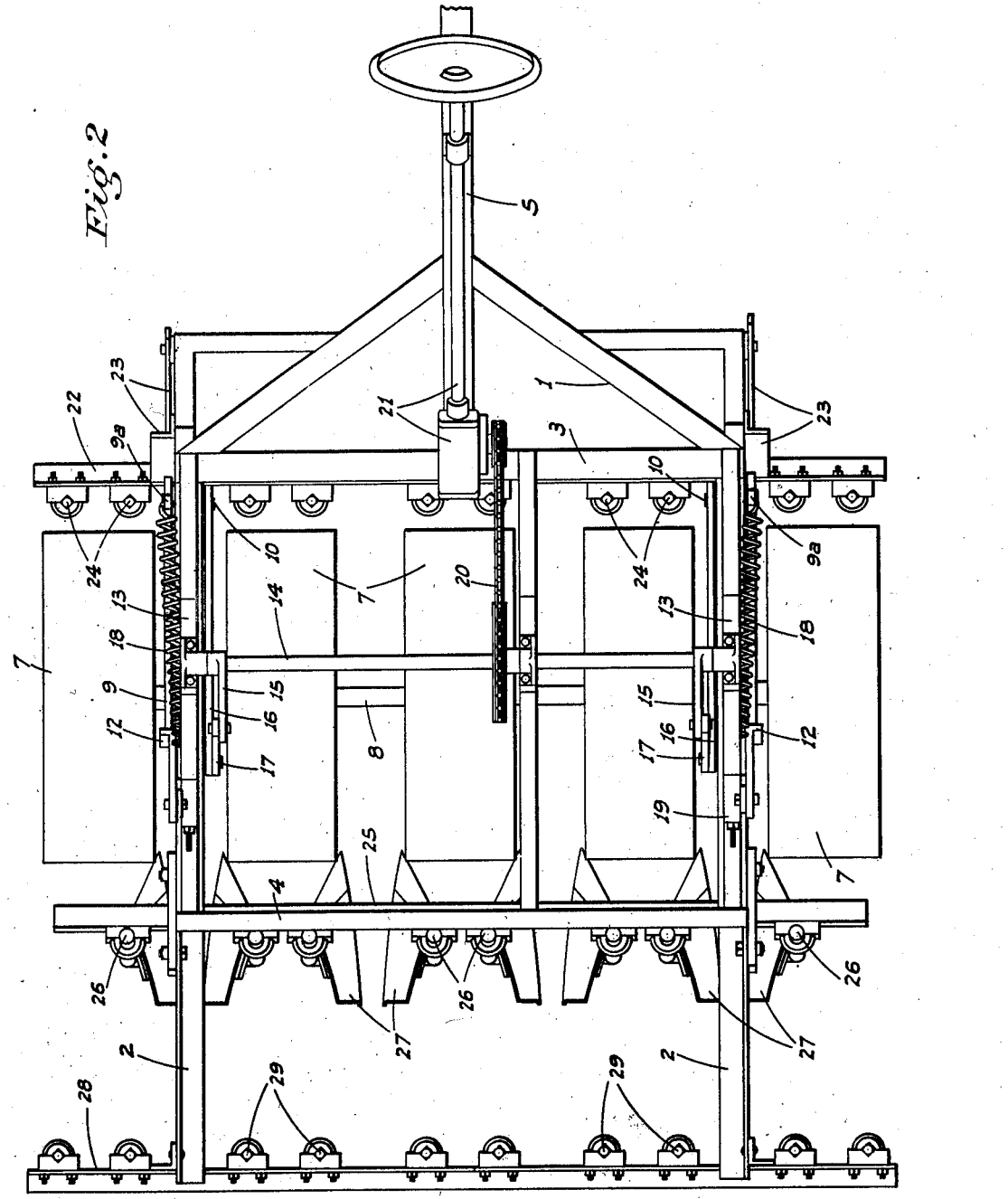

2,338,222

UNITED STATES PATENT OFFICE 2,338,222

IMPLEMENT FOR PREPARING BEET ROWS FOR HARVESTING

Roscoe C. Zuckerman, Stockton, Calif.

Application February 23, 1942, Serial No. 431,956

13 Claims. (Cl. 55—106)

This invention relates in general to an improved agricultural implement for use in the sugar-beet growing industry, and in particular the invention is directed to a unique implement for preparing beet rows to facilitate subsequent harvesting of the beets.

Where sugar beets are grown in certain sedimentary soils the surface of such soil adjacent and along the rows and about the beets often becomes surface-hardened or crusted by the time the beets are fully developed and ready for harvest. As a result when a beet harvesting implement is used in the field the digger or lifting mechanism, which penetrates the soil to some depth, causes the crusted surface of the soil to fracture into cakes or large chunks along the beet row and some distance ahead of the beets being lifted. This results in operating difficulties, including the problem of separation of beets and those of the cakes or chunks of soil which, due to their size, gain access to the pick-up elevator of the harvester. For example, it has been found that when beets are harvested by the method and apparatus shown in my allowed application, Serial No. 312,709, filed January 6, 1940, now U. S. Patent No. 2,288,985 no problems are encountered in loose soils—as the peat of the Delta region of the San Joaquin Valley of California—but in sedimentary soils the aforementioned difficulties occur.

It is therefore the principal object of this invention to provide a unique method and implement adapted to be employed shortly in advance of the beet harvesting operation, and which method and implement are effective to condition the crusted top soil adjacent and along beet rows, so as to prevent fracturing and chunk upheaval upon subsequent digging or lifting of the beets by the harvester.

A further object of this invention is to provide a method and implement, as above, which not only conditions the soil along beet rows for subsequent harvesting of the beets, but also accomplishes an initial loosening and slight lifting of the beets, whereby to aid harvesting, particularly when carried out in the manner evidenced by my above identified method and apparatus.

An additional object of this invention is to provide an implement which includes means operative with advance of the implement to rip or break up the crusted soil along and adjacent each row, to then impart a rolling and pulverizing action to the broken up soil, to subsequently effect an initial loosening and slight lifting of the beets while the soil adjacent but laterally and slightly ahead of the beets is under the compression of the rolling action, and to finally effect a further working of the rolled and compressed soil to complete pulverization thereof.

It is also an object of the invention to provide a method of conditioning crusted soil along and adjacent beet rows prior to harvesting of the beets comprising—as a continuous operation—the steps of ripping or breaking up the crusted soil in parallel paths on opposite sides of the row in an advance zone, then rolling and compressing the disturbed soil along said paths in a following but adjacent zone, initially loosening and slightly lifting the beets in a zone relatively close to but rearwardly of the zone of compression, and finally reworking the soil in a rearmost zone to further pulverization thereof.

A further object of the invention is to produce a simple and inexpensive implement, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the improved implement with the rear wheel removed.

Figure 2 is a plan view of the implement.

Referring now more particularly to the characters of reference on the drawings, the implement—here shown of four-row capacity—comprises a rectangular horizontally disposed frame I of substantial width, said frame including side beams 2, a front cross beam 3 and a rear cross beam 4. The frame I is fitted with a forwardly extending draft beam 5 suitably braced in connection with the main frame and including a draft hitch 6.

A plurality of transversely spaced wide faced or roller type wheels 7 are journaled on an axle 8 which is arranged in supporting relation with the frame as follows:

A bellcrank 9 is pivoted on each side beam 2 on a pivot 10 disposed some distance ahead of axle 8, corresponding relatively long arms of the bellcranks extending rearwardly at a normal slight downward slope to the axle which is connected thereto by journal boxes 11. An adjustable arm engaging stop 12 limits relative downward movement of the frame relative to the wheels and axle, while elevating movement of the frame is accomplished by means of the following mechanism:

The main frame 1 carries a secondary frame, indicated generally at 13, which supports a transverse shaft 14 disposed some distance above the main frame. Radial arms 15 are fixed on and project at an upward and rearward slope from shaft 14 in the vertical plane of other bellcrank arms 16 formed unitary with the bellcranks 9 but disposed inwardly of said beams 2. Rigid links 17 adjustably connect between the outer end portions of radial arms 15 and bellcrank arms 16. It will be seen that with rotation of shaft 14 the arms 16 will shift either upwardly or downwardly, resulting in a corresponding movement of the main frame 1 relative to the wheels 7.

A heavy duty tension spring 18 connects between the upper end of the upstanding arm 9a of each bellcrank 9 and extends rearwardly beyond the axle 8 to adjustable connection with a bracket 19 mounted rigid with frame 13.

Control of rotation of shaft 14 may be accomplished in any suitable manner, either manually from the implement or by power means from the tractor to which the implement is adapted to be connected. In the present instance I show such means as a sprocket and chain unit indicated generally at 20 arranged for manual actuation by a hand wheel and worm gearing assembly indicated generally at 21.

The adjacent wheels 7 are spaced apart a distance to permit said wheels to straddle a row of beets without injury thereto but in close proximity; there being five wheels here shown so that the implement may encompass four rows of beets with each passage through the field.

A horizontal cross bar 22 is suspended beneath the frame ahead of the wheels and maintained in rigid position by means of adjustable supporting arms 23; this cross bar being of a length at least as great as the full tread of the implement. Five pairs of ground engaging ripper teeth 24 are secured to crossbar 22 ahead of wheels 7 and within the path to be traversed by the latter, these teeth being adjustable vertically—independently of frame adjustment—to control ground penetration.

Another crossbar 25 is mounted in rigid connection with the main frame adjacent but below the latter and a short distance rearwardly of wheels 7; this crossbar 25 also being of a length equal to the tread of the implement. Suspended from said crossbar 25 by shanks 26 are four pairs of beet engaging and lifting blades 27 of the "Colorado" type. The blades of each pair converge rearwardly and are disposed to engage and cooperate with the beets of each row passing between adjacent wheels 7. The pairs of blades 27 are adjusted so as to effect only an initial loosening and slight vertical lifting of the beets of the rows. As is apparent, the mounting of the shanks 26 permit of adjustment of the blades 27, both as to depth of cut, angle of divergence, etc.

The side beams 2 of the main frame extend rearwardly some distance beyond crossbar 25 in overhanging relation to the ground and at their rear ends support additional crossbars 28 to which are attached in adjustable relation five other pairs of ripper teeth 29, which correspond to teeth 24, and are likewise set to work the soil in the path of the wheels 7, but in following relation.

In operation, the implement is drawn by a tractor and advances along the rows, encompassing four rows at a time. The top surface of the soil, here diagrammatically indicated at S, is crusted along the beet rows ahead of ripper 24 in zone A. In zone B between ripper teeth 24 and the point of contact of the roller type wheels 7, the soil is ripped or broken into cakes or chunks. However, with passage of wheels 7 over such disturbed soil the latter is compressed and pulverized and remains in this condition in zone C, which extends from the wheels to ripper teeth 29, where the soil is again disturbed and further pulverized by said teeth 29. Intermediate the wheels 7 and teeth 29 and in zone C, the pairs of blades 27 engage, initially loosen, and slightly lift the beets; such action taking place sufficiently close to wheels 7 that the soil adjacent and ahead of the beets is under sufficient compression that it does not rise up with the beets when the latter are given a slight lift by the pairs of blades 27.

After passage of the implement it will be seen that the soil adjacent and along the beet rows is well pulverized and the beets have been slightly lifted therefrom. Consequently when the harvester passes over the beet rows the beets are readily lifted from the ground without interference by any large cakes or unbroken chunks of soil, and there is no fracturing or piling up of crusted soil ahead of the beet digging and lifting mechanisms. Any of the conditioned soil which may feed onto the beet elevator with the beets will readily separate from the latter, as such elevators are commonly of the grate type or foraminous.

From the foregoing description it will be readily seen that I have produced such a method and implement as substantially fulfills the objects of the invention as set forth herein.

While this specification sets forth in detail the present and preferred construction of the implement, still in practice such deviations from such detail may be resorted to as do not form a departure from the spirit of the invention, as defined by the appended claims.

Having thus described my invention, what I claim as new and useful and desire to secure by Letters Patent is:

1. An implement for preparing a beet row for harvesting when the soil along the sides of the row is crusted, comprising a frame disposed above the ground, transversely spaced roller-type wheels supporting said frame, said wheels being disposed apart a distance to permit of the passage of a row of beets therebetween in adjacent but clearance relation, means suspended from the frame to break up said crusted soil in the path but ahead of said wheels, and means suspended from said frame rearwardly but adjacent said wheels to engage, initially loosen, and slightly lift the beets of the row with forward movement of the implement.

2. An implement for preparing a beet row for harvesting when the soil along the sides of the row is crusted, comprising a frame disposed above the ground, transversely spaced roller-type wheels supporting said frame, said wheels being disposed apart a distance to permit of the passage of a row of beets therebetween in adjacent but clearance relation, means suspended from the frame to break up said crusted soil in the path but ahead of said wheels, means suspended from said frame rearwardly but adjacent said wheels to engage, initially loosen, and slightly lift the beets of the row with forward movement of the implement, and other means suspended from the frame rearwardly of said beet loosening and lifting means to further work the soil in said paths after passage of said wheels.

3. An implement for preparing a beet row for harvesting when the soil along the sides of the row is crusted, comprising a frame movable along the ground, longitudinally spaced sets of ground working tools mounted on the frame and disposed to the sides of the row of beets, beet loosening and lifting means mounted on the frame between the sets of tools, and transversely spaced ground engaging rollers mounted in connection with and supporting the frame; said rollers being disposed between the leading and trailing ones of said sets and engaging the ground adjacent but ahead of said beet loosening and lifting means.

4. An implement for preparing a beet row for harvesting when the soil along the sides of the row is crusted, comprising a frame disposed above the ground, transversely spaced ground engaging rollers, said rollers being spaced a distance to permit the rollers to straddle a beet row in adjacent but clearance relation, means mounting the frame in supported relation on the rollers and for relative vertical adjustment, and beet loosening and lifting means suspended from the frame in position to engage beets in the straddled row, said mounting means comprising transversely spaced arms pivoted on the frame and extending at a rearward and downward slope, an axle journaled between said arms and on which axle the rollers are mounted, and means normally holding said arms against movement but being operative to swing the same vertically.

5. An implement for preparing a beet row for harvesting when the soil along the sides of the row is crusted, comprising a frame disposed above the ground, transversely spaced ground engaging rollers, said rollers being spaced a distance to permit the rollers to straddle a beet row in adjacent but clearance relation, means mounting the frame in supported relation on the rollers and for relative vertical adjustment, and beet loosening and lifting means suspended from the frame in position to engage beets in the straddled row; said mounting means comprising transversely spaced bellcranks pivoted on said frame, corresponding arms of said bellcranks extending rearwardly at a downward slope, the rollers being journaled in connection with said arms, the other corresponding arms of said bellcranks extending upwardly, tension springs connected between said other arms and an anchor on the frame such that said springs urge said first named arms in a downward direction, and means normally holding said bellcranks against movement but being operative to swing the same about their pivots.

6. An implement for preparing a beet row for harvesting when the soil along the sides of the row is crusted, comprising a frame movable along the ground, transversely spaced ground working tools mounted on the frame and disposed to work the ground along the sides of the row, other ground engaging members mounted in connection with the frame and disposed to compact the ground worked by said tools, and beet loosening and lifting means mounted on the frame in a longitudinal plane between said tools and rearwardly of said members.

7. An implement for preparing a beet row for harvesting when the soil along the sides of the row is crusted, comprising a frame disposed above and movable along the ground, ground engaging rollers mounted in connection with said frame in transversely spaced relation, said rollers being spaced a distance to permit the same to straddle a beet row, a cross bar rigidly suspended from the frame ahead of the rollers, teeth mounted on said bar in position to engage and work the crusted soil along the sides of the row and ahead of said rollers, the rollers being disposed to traverse and compact the soil as worked by said teeth, and beet loosening and lifting means mounted on the frame in position to engage beets in the row with advance of the implement and after said compacting of the soil.

8. An implement for preparing a beet row for harvesting when the soil along the sides of the row is crusted, comprising a frame disposed above and movable along the ground, ground engaging rollers mounted in connection with said frame in transversely spaced relation, said rollers being spaced a distance to permit the same to straddle a beet row, a cross bar rigidly suspended from the frame ahead of the rollers, teeth mounted on said bar in position to engage and work the crusted soil along the sides of the row and ahead of said rollers, the rollers being disposed to traverse and compact the soil as worked by said teeth, beet loosening and lifting means mounted on the frame in position to engage beets in the row with advance of the implement and after said compacting of the soil, another cross bar rigidly suspended from the frame rearwardly of said rollers and beet engaging means, and other soil working teeth mounted on said other bar to engage and work the soil compacted by said rollers.

9. An implement for preparing a beet row for harvesting, comprising a frame disposed above the ground, transversely spaced ground engaging rollers mounted in connection with said frame, said rollers being spaced apart a distance to permit the rollers to straddle a beet row and to compact the soil on opposite sides thereof, and beet loosening and lifting means suspended from the frame in position to engage beets in the straddled row while the soil to the sides of said beets is under the compacting effect of said rollers.

10. An implement for preparing a beet row for harvesting when the soil along the sides of the row is crusted, comprising a frame disposed above the ground, transversely spaced rotary ground compacting members mounted in connection with said frame, said rotary members being spaced apart a distance to permit of the passage of a row of beets therebetween in adjacent but clearance relation, means suspended from the frame to break up said crusted soil in the path but ahead of said rotary members, and means suspended from said frame rearwardly but adjacent said rotary members to engage, initially loosen, and slightly lift the beets of the row with forward movement of the implement.

11. An implement for preparing a beet row for harvesting, comprising a frame disposed above the ground, transversely spaced rotary ground compacting members mounted in connection with said frame, said rotary members being spaced apart a distance to permit the members to straddle a beet row and to compact the soil on opposite sides thereof, and beet loosening and lifting means suspended from the frame in position to engage beets in the straddled row while the soil to the sides of said beets is under the compacting effect of said rotary members, 12. An implement for preparing a beet row for harvesting when the soil along the sides of the row is crusted, comprising a frame disposed above the ground, transversely spaced members mounted in connection with said frame adapted to move in engagement along and in compacting relation to the ground, said ground compacting members being spaced apart a distance to permit of the passage of a row of beets therebetween in adjacent but clearance relation, means suspended from the frame to break up said crusted soil in the path but ahead of said ground compacting members, and means suspended from said frame rearwardly but adjacent said ground compacting members to engage, initially loosen, and slightly lift the beets of the row with forward movement of the implement.

13. An implement for preparing a beet row for harvesting, comprising a frame disposed above the ground, transversely spaced members mounted in connection with said frame adapted to move in engagement along and in compacting relation to the ground, said ground compacting members being spaced apart a distance to permit the members to straddle a beet row and to compact the soil on opposite sides thereof, and beet loosening and lifting means suspended from the frame in position to engage beets in the straddled row while the soil to the sides of said beets is under the compacting effect of said members.

ROSCOE C. ZUCKERMAN.